United States Patent
Ebdon et al.

(10) Patent No.: US 8,401,514 B2
(45) Date of Patent: Mar. 19, 2013

(54) SYSTEM AND METHOD FOR CONTROLLING AN EMERGENCY EVENT IN A REGION OF INTEREST

(75) Inventors: Deren G Ebdon, Carrollton, TX (US); Robert W Peterson, Plano, TX (US)

(73) Assignee: Osocad Remote Limited Liability Company, Wilmington, DE (US)

( * ) Notice: Subject to any disclaimer, the term of this patent is extended or adjusted under 35 U.S.C. 154(b) by 302 days.

(21) Appl. No.: 12/629,942

(22) Filed: Dec. 3, 2009

(65) Prior Publication Data
US 2011/0136463 A1  Jun. 9, 2011

(51) Int. Cl.
*H04M 11/04* (2006.01)
(52) U.S. Cl. .................. 455/404.1; 455/404.2
(58) Field of Classification Search ............... 455/404.1, 455/404.2
See application file for complete search history.

(56) References Cited

U.S. PATENT DOCUMENTS

| 2005/0190053 A1* | 9/2005 | Dione ..................... 340/500 |
| 2006/0184319 A1* | 8/2006 | Seick et al. .............. 701/209 |
| 2009/0170468 A1* | 7/2009 | Kane et al. ............. 455/404.2 |

* cited by examiner

*Primary Examiner* — Kamran Afshar
*Assistant Examiner* — Omoniyi Obayanju
(74) *Attorney, Agent, or Firm* — Stolowitz Ford Cowger LLP

(57) ABSTRACT

An emergency response system of a premises uses an egress agent or application installed on mobile communications devices of users to provide evacuation instructions that are specific to the location of the user. The egress agents determine the location of their device and may determine an evacuation route from premises plans stored in the device or by transmitting their location to a server and receiving evacuation instructions from the server. Tracking of the devices along the evacuation route provides continual updates as to the relevant safety of an evacuation route.

21 Claims, 6 Drawing Sheets

US 8,401,514 B2

SYSTEM AND METHOD FOR CONTROLLING AN EMERGENCY EVENT IN A REGION OF INTEREST

FIELD OF THE INVENTION

This disclosure relates to emergency warning systems and in particular to emergency warning systems provided through portable or mobile telecommunications devices.

BACKGROUND OF THE INVENTION

Emergency evacuation systems and proceedings are an important aspect of a premises and typically include exit signs, alarms, speaker, one-way alerting systems, and prearranged emergency plans. In addition, individuals frequently present within a premises may participate in evacuation drills.

Problems with existing emergency systems include that signs may be obscured (due to smoke, fire, dust, or debris), damaged, destroyed, or may not be posted in all locations. A person may be vision impaired. Alarms typically only indicate to leave a building or campus, not how (other than by nearest possible exit). Messages over a loudspeaker are typically only targeted to the general community, not individuals, and may not be heard or understood. They also cannot communicate information to hearing impaired individuals or individuals who do not speak the language of the announcement. Current alerting systems (via phone, text message, computer based) are one-way. Prearranged emergency plans may not be available to the general public and cannot account for all contingencies. The escape route or muster point used during a routine drill may not be available, and individuals not frequently in the area are extremely unlikely to be aware of planned evacuation routes.

What is required is an improved system and method for use in controlling emergency situations within a premises.

SUMMARY OF THE INVENTION

In one aspect of the disclosure, there is provided a method for controlling an emergency event within a region of interest comprising determining a location of a mobile communications device within the region of interest, determining an emergency response specific to the device that is dependent on the location of the device, and communicating the emergency response from the device to a user of the device.

In one aspect of the disclosure, there is provided a mobile communications device comprising a location provider configured to determine a location of the device, a user interface configured to communicate information to a user of the device, communication circuitry for providing two-way wireless communications, and an agent. The agent is configured to receive a location of the device from the location provider, utilize the location of the device to determine an evacuation route from a region of interest, and communicate the evacuation route to the user through the user interface.

In one aspect of the disclosure, there is provided a computer-readable medium comprising computer-executable instructions for execution by a processor, that, when executed, cause the processor to receive a plurality of locations of a plurality of devices, determine a plurality of evacuation instructions for the plurality of devices, and cause the plurality of evacuation instructions to be transmitted to the plurality of devices.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
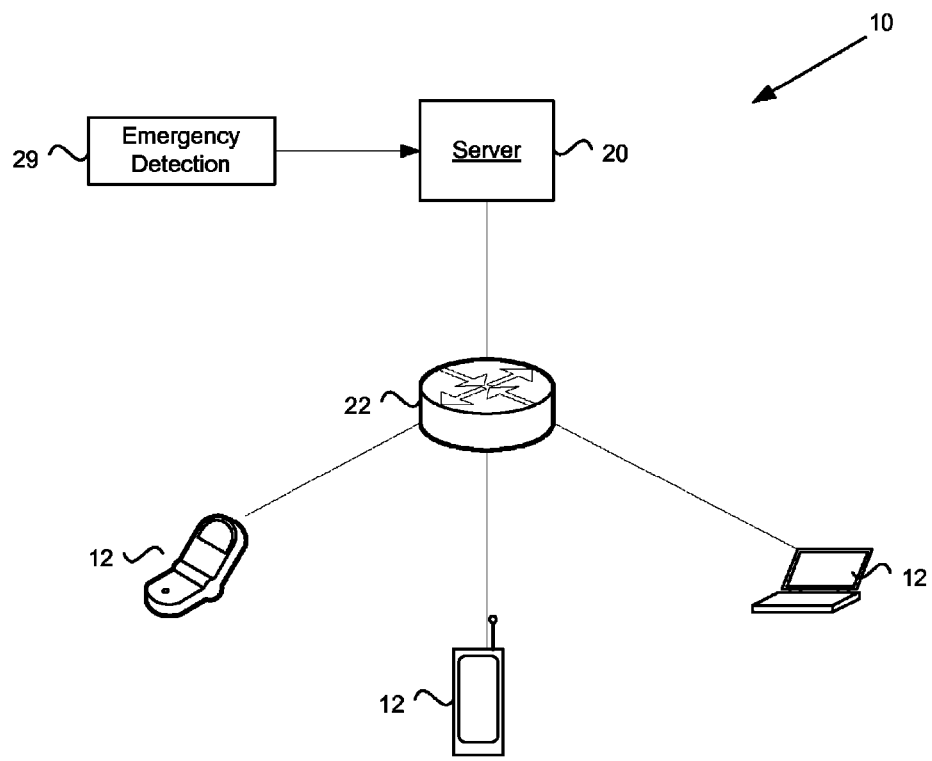
FIG. 1 illustrates an emergency response system for a premises.

In FIG. 1, there is shown an example of an emergency warning system 10 that may be implemented within a region of interest such as a city landscape or a premises such as within a building, campus, entertainment complex and the like. The emergency warning system 10 includes a server 20 that receives emergency alerts from an emergency detection system 29 such as a fire control panel or from a manually operated system. The server 20 communicates with mobile communications devices 12 within the region of interest through one or more wireless routers or base stations 22 to provide emergency response communications to mobile devices 12 located within the region of interest, i.e. within range of one or more or the wireless routers 22. While only one base station 22 is shown in FIG. 1 for clarity, a person skilled in the art will understand that many base stations may be distributed throughout a region of interest as required to provide appropriate coverage to the premises.

Figure 2:
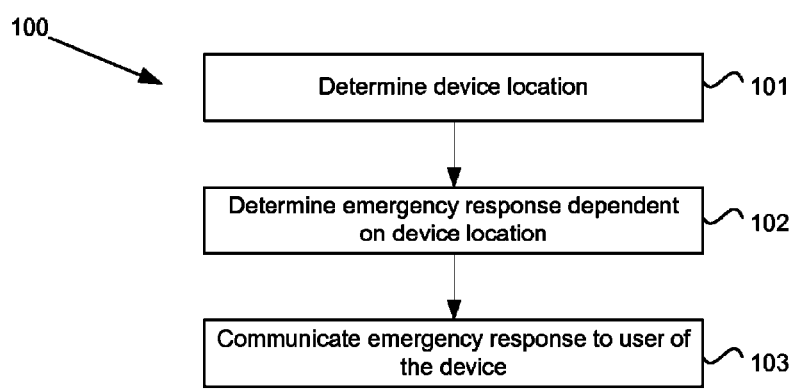
FIG. 2 illustrates a method for controlling an emergency event.

The system 10 shown in FIG. 1 may be used for controlling an emergency event within a region of interest, for example as illustrated in the flowchart 100 of FIG. 2. When an emergency event occurs within the region of interest, a location of a mobile communications device within the region of interest is determined at step 101. The system 10 is then able to determine an emergency response (step 102) that is specific to the device and in particular is dependent on the location of the device within the region of interest. The emergency response can then be communicated to a user of the device (step 103) for example by visual or audible instructions presented on the device.

In one embodiment, the emergency response may be an evacuation plan that directs the user of the device toward safety. An evacuation plan may comprise a series of instructions, such as "proceed to your nearest exit which is located at the north end of the building and then proceed down the fire escape and meet at the emergency assembly point which is located at Point X". In one embodiment, the emergency response may direct a user along a plan of a premises such as a floor plan or a campus plan. Alternatively, the emergency response may direct a user along a street map. The device's position may be tracked, either within the device or by sending positional information from the device to the server. The emergency response, in particular evacuation instructions, may be updated as the user progresses along an evacuation path, thereby providing "turn-by-turn" instructions.

Figure 3:
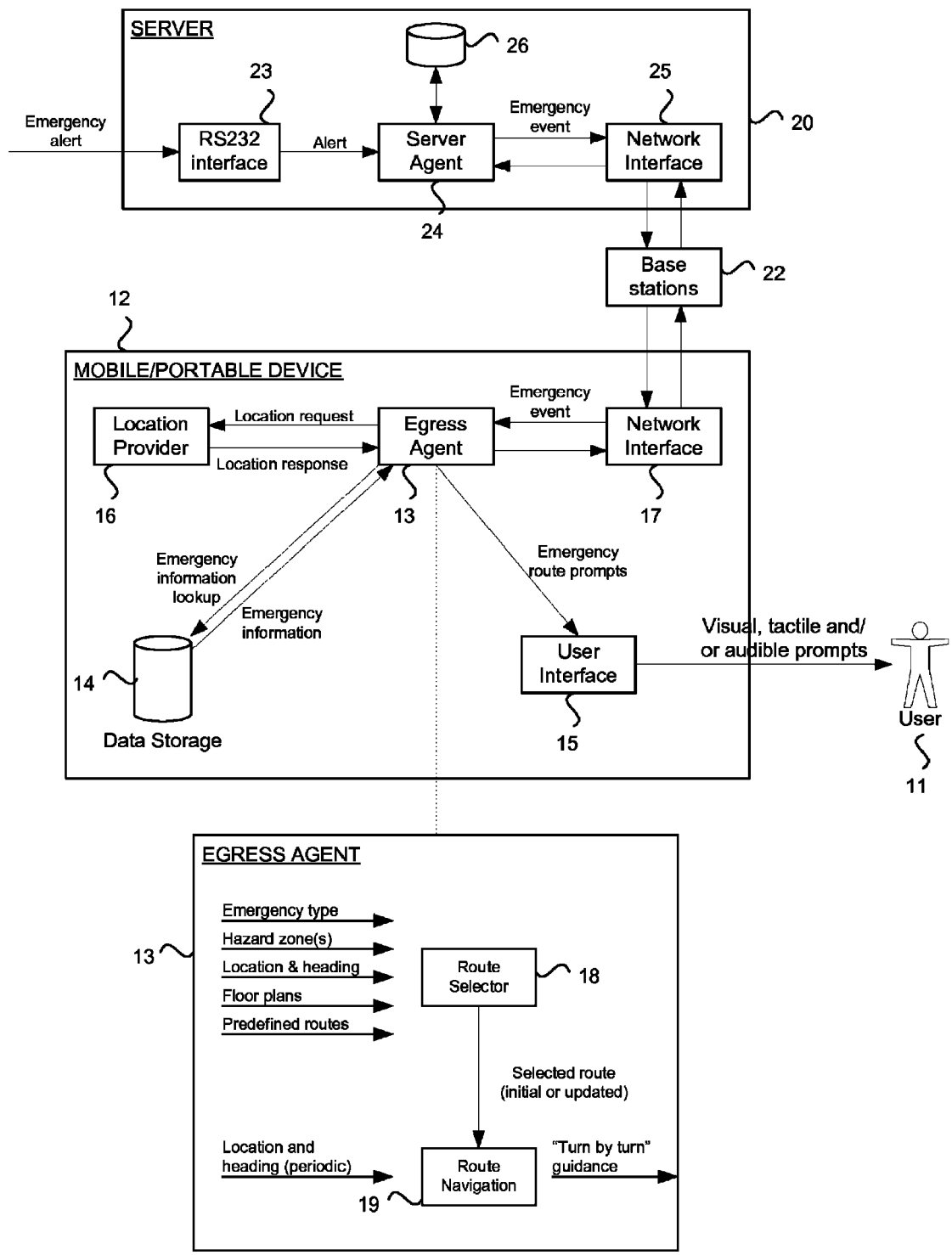
FIG. 3 illustrates details of a premises server and an egress agent on a mobile device.

Further detail of the system 10 is illustrated in FIG. 3. A premises server 20 includes an interface 23, such as a serial interface (RS232) for communicating with an emergency detection system of the premises. Emergency alerts are received through the interface 23. A server agent 24 receives and processes the emergency alerts and co-ordinates emergency events as will be described in greater detail below. The server agent 24 is communicably attached, e.g. by fixed line or wireless, to one or more base stations 22, which are in turn used by the mobile/portable devices to communicate with the server and other peers. Communications from the server agent 24 are provided via a network interface 25, which, in one embodiment, may be an Internet Protocol (IP) interface.

The server 20 serves a premises, such as a building, campus, entertainment area (e.g. stadium), and may be tasked with emergency management for the premises. The server may include a database or memory 26 that contains the complete premises plans, emergency routes, emergency plan, etc.

The server 20 may contain or be connected to an emergency detection system 29 (FIG. 1) such as a fire detection system. Alternatively or in addition, the server 20 may receive information on emergency situations from its users/administrators (e.g., building management or security) or from the emergency agents/applications on the mobile/portable devices. As mentioned previously, the server 20 may be able to wirelessly communicate with the devices hosting the emergency egress agents/applications described above. The server 20 may also be connected to a standard alarm system (sirens, loudspeaker, lights, and the like). While one server 20 is shown, multiple servers may be provided.

As described above, the emergency response system 10 uses functionality of mobile devices, which may be considered to be ubiquitous throughout a premises. In particular, a mobile or portable device 12 may have installed upon it a software application or agent 13, termed an egress agent herein. The mobile device 12 on which the egress agent 13 is installed may be any device capable of wireless transmission and receipt of data (such as by radio waves, light, or sound). Circuitry for wireless transmission and reception is considered to be well known in the art and so no details of the communications circuitry of the device is considered necessary here. The device may share at least one mechanism with other devices supporting the agent and the building or campus' server(s). This is to enable the peer-to-peer (agent to agent, agent to server), peer-to-group (agent to agent group, say all evacuees on the 4th floor), and global (multicast/broadcast) transmission of information. The mobile device 12 may be any suitable device such as a cellular phone, personal digital assistant (PDA), netbook, or laptop. The egress agent 13 receives emergency event notifications from the server agent 24 through a network interface 17 of the device 12 in communication with the corresponding network interface 25 of the server 20 through base stations 22.

The egress agent 13 is configured to receive data from the premises' emergency systems or centralized emergency system, other agents, and the user. The agent may send and/or receive information wirelessly via radio, infrared, digital or video camera, keyboard, sound, or other environmental sensors. The egress agent 13 may be installed on the mobile device 12 prior to or during an emergency event using a standard deployment mechanism (automated or otherwise) for the device. The egress agent 13 may either be specific to a premises, e.g. a building or campus, or a more general agent or application which can assist the user in evacuation from buildings/campuses supporting a common format for emergency data and protocols for transmission of the data.

The egress agent 13 may receive information regarding the emergency plan, floor plan, emergency routes, exits, muster points, etc., at the time of emergency. Alternatively, the information may be pre-loaded prior to an emergency and stored in a suitable database or memory 14 within the device 12. Pre-loading may occur as a manually initiated step. That is, a user may contact the server through the egress agent and select premises plans for the premises. Pre-loading may also occur as an agent or server initiated step. That is, when a device enters a region controlled by the server 20, the device will register for communications with the server, as is known in the field. The registration process may be modified in accordance with an embodiment of the disclosure to provide the device with up-to-date premises plans. In one embodiment, the server may detect that the device is enabled with the egress agent and automatically provide the premises plans to the device. Similarly, the egress agent may detect that the server is enabled with appropriate emergency response procedures and may therefore request the premises plans as part of the procedure of registering with the server.

The premises plans received into the device may be a complete premises plan or partial premises plans. Where a user pre-loads a premises plan into the device, the premises plan may be those areas of a premises that the user frequents. Where a device receives a premises plan during an emergency situation, the premises plan may be that portion of a plan that is relevant for a user's evacuation, as determined from the device location, and may omit details that the user will not be directed to.

The egress agent 13 can provide a user interface 15 that allows for receipt and entry of information by the user, and may utilize, without limitation, audible commands and messages, keypad or touchpad entry, graphics, and tactile feedback. The egress agent 13 uses the device's location, determined by a location provider 16 in response to a location request. The location may be determined relative to the building or campus, or in spatial coordinates (e.g. GPS coordinates), with sufficient accuracy for the required scale. For example, a building may require better accuracy than a campus, say 3 to 5 meters versus 10 to 20 meters. The location provider may be capable of receiving information regarding the device's location within the building through any suitable means such as through GPS, cellular system, near field radio, digital/video camera, triangulation or sound cues from the emergency system's alarms. Additionally, if the device is equipped with an accelerometer or digital compass then the agent may use data from such equipment to monitor movement.

As shown in FIG. 3, an egress agent 13 may include a route selector 18 and route navigation 19. The route selector is configured to perform decision based processing using such inputs as an emergency type, one or more hazard zones (location of emergency event), location and heading, floor plans and predefined routes or waypoints. The route selector 18 communicates a selected route to the route navigation 19 which generates commands for a user to guide the user along the selected route. The route navigation 19 also receives updated location and heading data, e.g. from the location provider or from the server agent, to generate continual navigational information for the user, such as emergency prompts potentially including "turn by turn" guidance.

In one embodiment, the egress agent 13 may be installed on the devices of occupants of a premises at some time prior to an emergency event. Such a situation may occur, for example, in a work premises or in home accommodation, where particular device users are regular occupants of a building or similar venue. These devices may also preload building or campus plans, including preferred evacuation routes and muster locations, and continuously update the preferred route during an event based on information received from the facility's authorities and/or from peer devices.

Figure 4:
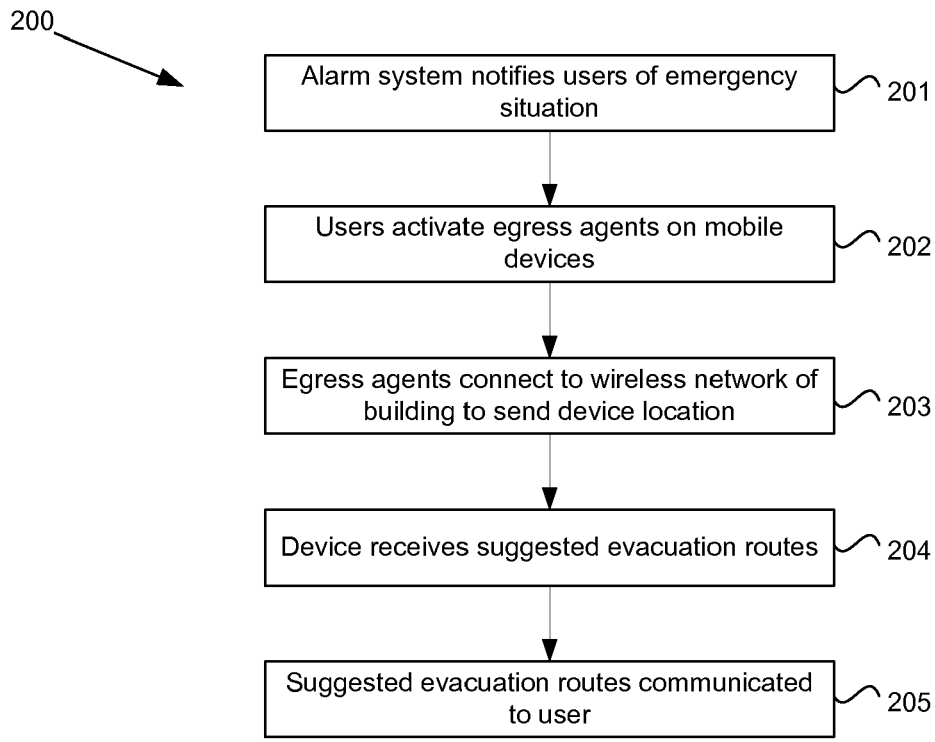
FIG. 4 illustrates a method for providing evacuation routes from a server to a mobile device.

A method for coordinating an emergency response using the egress agents is illustrated in the flowchart 200 of FIG. 4. At step 201, after an emergency threat is detected, a building emergency management server receives notification of a fire alarm and uses an alarm system to notify individuals present of the emergency situation. The emergency alert received at the server may include an indication of the location of the emergency event, such as a campus or building zone. At step 202, users 11 activate their egress agent (via standard device inputs on user interface 15 such as keypad, touch pad/screen, or microphone). The egress agents 13 then instruct the respective device 12 to connect to the building's wireless network and begin multicast transmissions identifying the device and its location (step 203). The building server 20 sends suggested evacuation routes to the agents 13 (step 204), which in turn employ a user appropriate mechanism to guide the user on the appropriate route (step 205). For example, a hearing impaired individual would be given visual or tactile prompts and a blind individual would be given audible or tactile prompts. Users of the emergency egress agent may also guide others without the agent on the indicated route to a safe exit. In this embodiment, the server agent 24 processes the device locations of the devices 12 to determine appropriate evacuation paths and transmits the evacuation paths to the devices for communication to the users.

Figure 5:
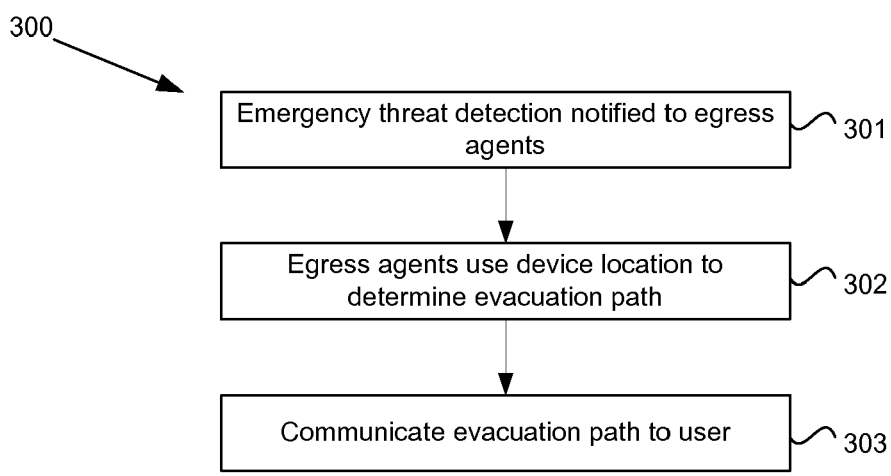
FIG. 5 illustrates a method for determining an evacuation route within a mobile device.

In an alternative method, illustrated in the flowchart 300 of FIG. 5, determining the emergency response, i.e. selecting an evacuation path, may be performed in the device 12 by the egress agent 13. For example, at step 301, the building emergency management server 20 receives notification of fire alarm and sends a message to the devices 12 located within the building to activate their emergency egress agents/applications. The egress agents 13 notify the users of the emergency situation and the agents use the current location provided by location provider 16 to choose an appropriate evacuation path (step 302). The egress agents may then guide their users on the selected route. In this embodiment, the server may optionally continue to provide hazard zones and evacuation route information (e.g. newly identified hazards, non-functional exits, etc.) to the egress agents and the agents may reselect an appropriate evacuation path. Additionally, the data storage 14 of the mobile device 12 may be capable of storage of the portion of the premises plan and emergency route required by the user for safe exit. The premises plan may be pre-stored in the device memory 14 or may be downloaded from the data store 26 of the server agent 24 during the emergency event.

In one embodiment, the data store 26 of the server agent 24 may store positional data that correlates each location within a premises to at least one evacuation path. Where possible, locations within the premises are mapped to multiple evacuation paths in order that users can still be directed along a second option path where a first option path has become undesirable (e.g. unavailable, overcrowded at exit, etc). Pre-determining the evacuation paths for specific locations can assist in speeding the calculation or selection of an evacuation path during an emergency event, rather than requiring the server or agent to plot an evacuation path in real-time.

In one embodiment, the system may make use of two-way communication of emergency based information to provide updating of potential evacuation routes. For example, the server agent 24, may include a route planner component configured to adjust to real time information and feedback regarding device locations, device routes, hazards, and safe routes/exits. In addition to providing a direction toward safety, the route planner component of the server agent 24 may also inform device agents to notify their user to halt, move to a location and wait for emergency personnel (e.g. where there is no exit or user agent reports that user is injured/handicapped), or to seek cover (e.g., a shooter is running through the building). The server agent 24 may be implemented using an expert system and may be configured to intelligently reroute the user (if possible) if the user deviates from a given route, as well as raise that event to other users to assist in their route planning. For instance, if multiple evacuees reverse direction in a hallway, where the hallway was the suggested evacuation route, then the route planning software may tag that route as potentially blocked or unsafe. With the routing component, the server agent 24 is able to guide the user to the optimal exit or place of safety or assistance.

Figure 6:
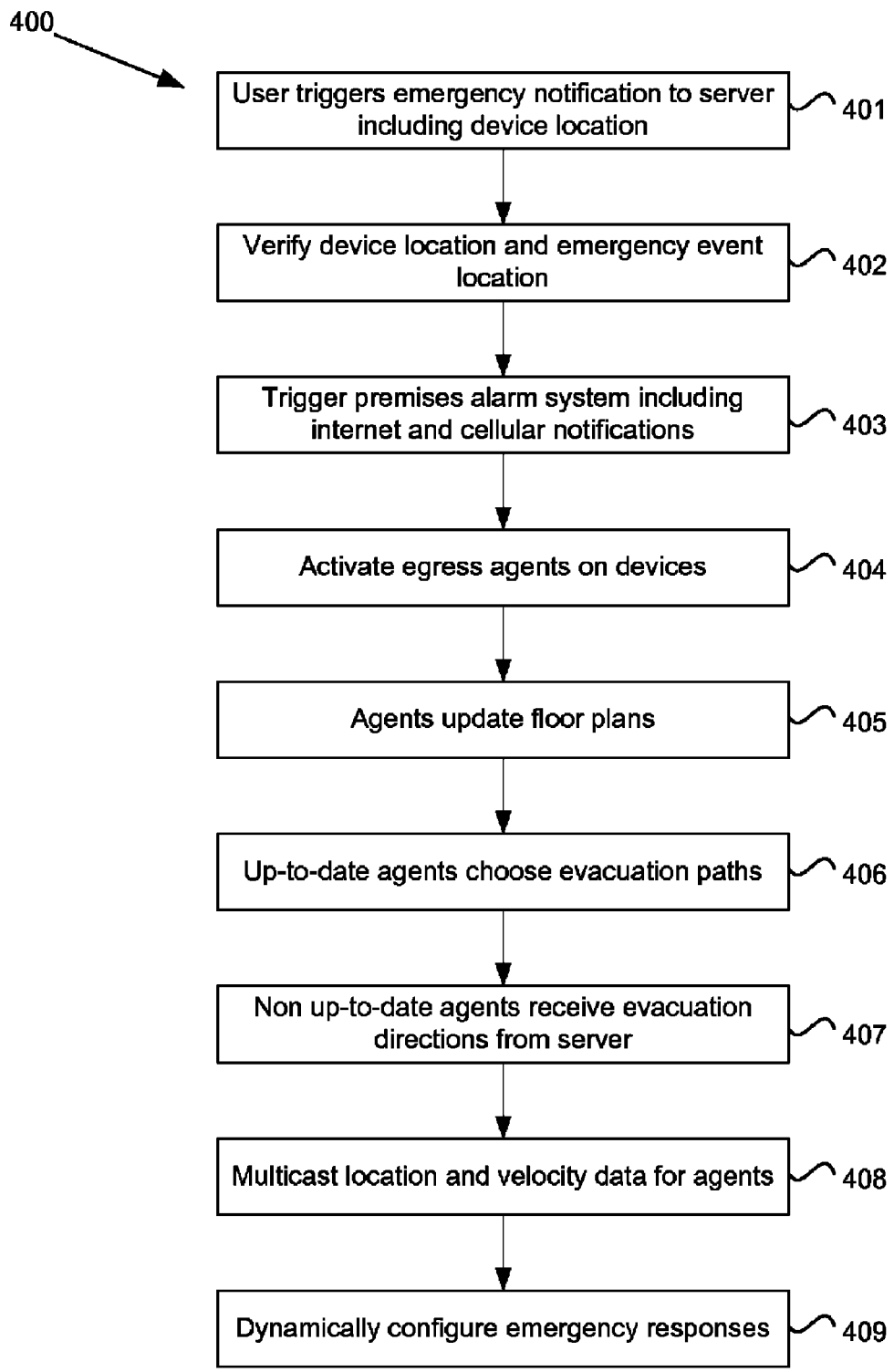
FIG. 6 illustrates a method for controlling an emergency event using feedback from egress agents of mobile devices.

A method for operating an emergency response using real-time route planning is shown in the flowchart 400 of FIG. 6. This embodiment also demonstrates, at step 401, that a user of a first device, device A, can trigger the emergency response. When the user first confronts an emergency such as a fire, the user may send a message to the server agent 24 from their device that conveys the emergency information. For example, a user may open their phone, thus activating voice command mode, and shout "Fire!". The voice command triggers the emergency egress agent, which connects to the building's wireless LAN and sends an emergency notification to the building's server. Other methods for triggering the emergency response include selecting a one-touch button on the device 12 or dialing a pre-determined number that activates the egress agent and transmits an emergency notification to the server agent. The notification from the device to the server may include a device location.

The server agent 24 records the device location (step 402) to verify the location of the emergency event. The server agent 24 then triggers the alarm system (step 403) as well as notifying an Internet and cellular alert notification system. Other devices within the premises respond to the alarm by automatically activating their respective agents or are manually activated by their respective users (step 404). In one embodiment, Device B may detect the alarm sounding via its microphone and activate the egress agent on the device. Device C may be notified of the event by a special text message sent via a cellular network, while Device D is notified via the Internet. A user of device E may activate the egress agent on his device via key combination after hearing the alarm sound. Device F may be already connected to the wireless LAN and activates its egress agent as soon as the message from Device A is received via the wireless LAN. After activation, each of Devices A-F are connected to the premises' wireless LAN.

At step 405, the activated agents A-F ensure that their respective device storage contains the latest relevant floor plan, evacuation routes (for the indicated hazard, in this case, fire), and safe exits. If at least one agent requires the information, then the information may be transmitted by the server, for example using multicast over the wireless LAN. In the present example, Devices A-D are already up to date and the egress agents on those devices choose the appropriate evacuation route based on the device's current location (step 406). Devices E and F are out of date, so the server sends turn-by-turn instructions to those devices' agents until they are synchronized (step 407).

Agents A-F take periodic location samples to gauge velocity and progress along a route. This information is multicast with a UTC time stamp to all agents including the server agent (step 408). The server agent or egress agents receiving the location, velocity and time of other agents are able to process this data to dynamically reconfigure their respective emergency responses (step 409).

For example, Agent C may detect that the user has deviated from the planned route and uses the speaker on the device to ask the user "Is Route Blocked or Unsafe?" The user of device C shouts "Yes!" or otherwise indicates that the selected route is unsafe, e.g. by selection of a button on the device keypad. Agent C then multicasts the route update to the other agents and then selects the next best route and uses audible prompts to guide the user. Agent D may be on the same route as Agent C and receives the route update. Agent D then chooses the next best route.

In another area, Agent B detects that Device B is not making progress along the route, e.g. by using location information (and optionally accelerometer and compass data), and prompts the user to indicate the reason for delay. User of device B responds that they are trapped. Agent B multicasts the alert to all agents. The server responds by relaying User B's status and location to first responders. Agent A receives the updates from B and C and determines that all routes are now blocked. It notifies the server, which instructs the agent to wait, and notifies first responders.

The server agent 24 receives information from an operator that first responders will evacuate the fourth floor by the north windows, and multicasts this route update to the other agents. Agents A and B receive the update and instruct their users to move to the north windows.

The system may also be configured to use devices on the premises to multicast server messages. In the current example, power to the server machine goes critical on backup power and it shuts down. Agents E and F have not finished updating and so Agent D is elected to complete the multicast of emergency data, which it does using its stored data. Agents E and F complete the update and select best routes for exit based on the latest information. Agent E is informed of a route hazard by its user, and reselects a route to the windows on the fourth floor. All users evacuate, or are evacuated successfully.

In one embodiment, the agents may operate expert systems that can automatically decide changes to the emergency responses. For example, Agents A, B, C are guiding their users along a common escape route. Agents A and B detect a reverse in direction on the planned route and an increased velocity. These events are multicast. Agents A and B infer without user input that the route is blocked (based on expert rules) and Agent A sends a route update. Agents A and B select the next best route while Agent C receives the route update and selects the next best route.

While the above examples describe evacuation procedures, the system can be used for other emergency responses. For example, a shooter is running through a building and the users' emergency egress agents are activated and up-to-date. The server agent detects a scattering pattern among the user agents and infers the possible location of the shooter. The server agent sends real-time routing updates or duck-and-cover alerts based on that inference to user agents. The server instructs the user agents to listen on the device's microphones for corroboration of shooter's location based on gunshots.

Particular advantages of an emergency procedure as described above are that it can adapt to changing situations and allows dissemination of emergency plan information to the general public. The above described systems can assist the user when visibility is impaired or when the user is sight impaired.

As described previously, current alerting systems are one-way and do not enable time critical communications from the users. Some of the above described embodiments enable users or user's agents to provide feedback regarding the hazard and safe exits to assist others in evacuation route planning as well as to first responders. By knowing the safe paths, the agent is able to provide the user with the safest and quickest exit route from the user's current location.

The system also advantageously assists in preventing injuries and loss of life in an emergency, and in maintaining order. It reduces congestion during an evacuation, resulting in more rapid escape from the hazard.

While the emergency responses have typically been described in the above embodiments as directing users in danger away from an emergency situation, in other embodiments, emergency responses could direct personnel such as rescue services and first responders towards an emergency event. For example, in one embodiment, device tracking could determine where evacuees are most heavily concentrated and thus rescue services that need to avoid the evacuees to reach the emergency event, such as firefighters, may be directed via alternative routes within the premises.

The embodiments and examples described above make specific reference to premises such as buildings, campuses, etc. However, the concepts described herein may be extended to any region of interest. In one embodiment, an emergency system may be applied to a wide area region of interest, such as a city landscape or similar public area.

Figure 7:
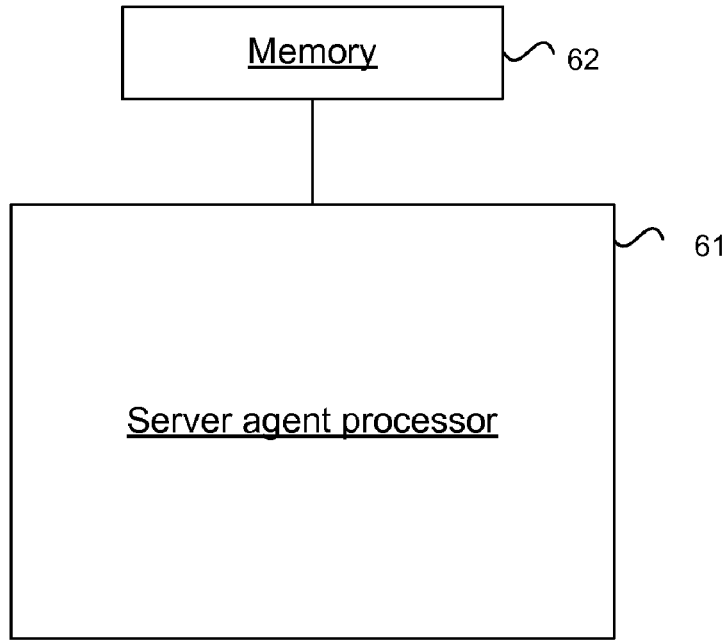
FIG. 7 illustrates a processor and memory of a server agent.
Figure 8:
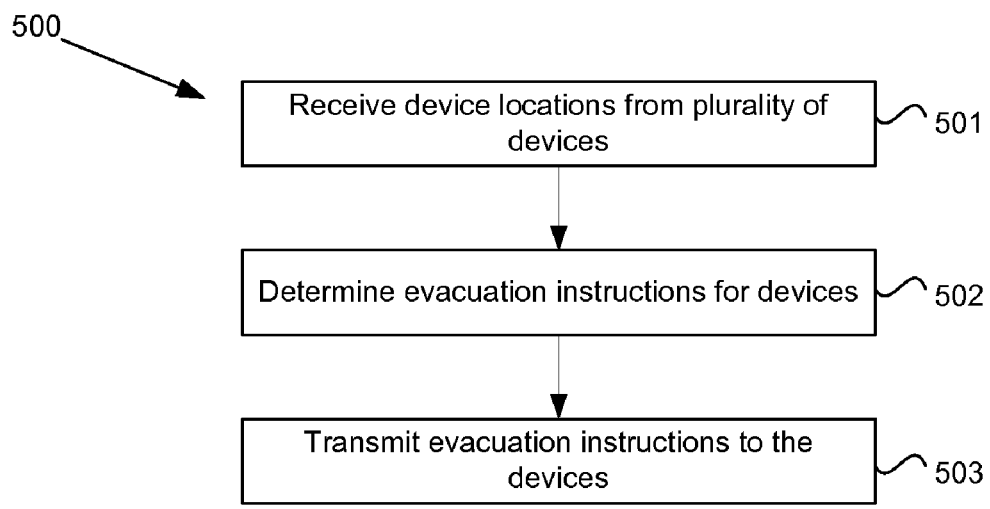
FIG. 8 illustrates an instruction set executable on the processor of FIG. 7.

The components of the system 10 may be embodied in hardware, software, firmware or a combination of hardware, software and/or firmware. In a hardware embodiment, the server agent 24 may be executed on a processor 61 operatively associated with a memory 62 as shown in FIG. 7. In addition to premises plans and the like, the memory 62 may store instructions that are executable on the processor 61. An instruction set 500 that may be executed on the processor 61 is depicted in the flowchart of FIG. 8. Specifically, when executed, the instruction set 500 allows the processor to receive a plurality of device locations from a plurality of devices (step 501) during an emergency event. The processor 61 can determine a plurality of evacuation instructions for the plurality of devices (step 502) and cause the evacuation instructions to be transmitted to their respective devices 503.

Figure 9:
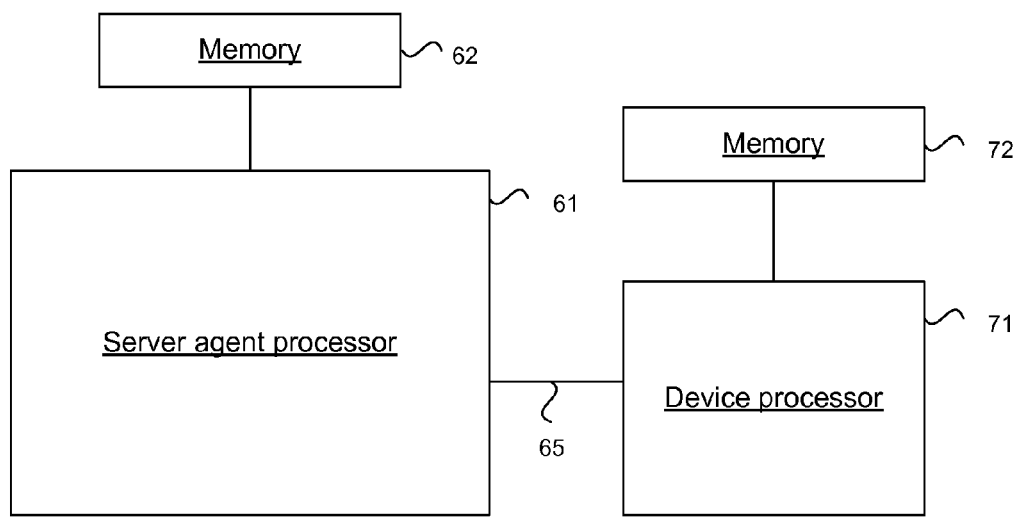
FIG. 9 illustrates the processor and memory of a server agent in communication with a processor of a mobile device that can execute an egress agent.

As shown in FIG. 9, the processor 61 may communicate through a suitable communications link 65 with further processors, such as a processor 71 of a device 12 with associated memory 72. Through the communications link 65, the processor 61 may receive location updates from the device and provide modified evacuation instructions, such as an indication that a first selected evacuation route is unsafe and/or instructions for an alternative evacuation route.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   receiving an indication of an emergency event at a mobile device executing an egress agent;
   transmitting a location of the mobile device within a region of interest from the mobile device using a peer-to-peer mechanism to another mobile device executing another egress agent in response to the indication of the emergency event;
   activating, using the egress agent executing on the mobile device, an emergency response specific to the mobile device that is dependent on the location of the mobile device;
   periodically receiving, at the mobile device, a current location of another mobile device and a velocity and a time associated with the another mobile device within the region of interest using a peer-to-peer mechanism from the another mobile device; and
   dynamically changing, using the egress agent executing on the mobile device, the emergency response specific to the mobile device based at least in part on the current location of the another mobile device and the velocity and the time associated with the another mobile device.

2. The method according to claim 1, further comprising-accessing, using the egress agent executing on the mobile device, the emergency response from a memory in the mobile device in response to the indication of the emergency event.

3. The method according to claim 2, further comprising:
   receiving, at the mobile device, a plan of the region of interest from a server agent executing on a server; and
   determining, using the egress agent executing on the mobile device, an evacuation route relative to the plan.

4. The method according to claim 3, further comprising receiving, at the mobile device, the plan into the mobile device in response to the indication of the emergency event.

5. The method according to claim 1, further comprising pre-loading the plan into a memory of the mobile device at initialization of the egress agent executing on the mobile device.

6. The method according to claim 1, further comprising-receiving, at the mobile device, the emergency response from a server.

7. The method according to claim 1, further comprising activating, using the egress agent executing on the mobile device, the emergency response according to the location of the mobile device relative to a location of the emergency event.

8. A mobile device, comprising:
   a location provider configured to determine a location of the mobile device; and
   an egress agent executing on the mobile device and configured to:
      determine an evacuation route for a region of interest according to the location of the mobile device in response to an indication of an emergency;
      communicate the evacuation route through a user interface;
      periodically receive a location of another mobile device within the region of interest from the another mobile device using a peer-to-peer mechanism;
      periodically receive a velocity and a time associated with the another mobile device from the another mobile device using the peer-to-peer mechanism; and
      update the evacuation route based at least in part on the location of the another mobile device and on the velocity and the time associated with the another mobile device.

9. The mobile device according to claim 8, wherein the egress agent is further configured to:
   access at least one premises plan in a memory; and
   determine the evacuation route in response to the location of the mobile device on the at least one premises plan.

10. The mobile device according to claim 8, wherein the egress agent is further configured to:
    transmit the location of the mobile device to a server; and
    receive the evacuation route from the server.

11. The mobile device according to claim 10,
    wherein the evacuation route comprises one or more directions for evacuating the region of interest along the evacuation route; and
    wherein the egress agent is further configured to communicate the one or more directions through the user interface.

12. The mobile device according to claim 8, wherein the egress agent is further configured to:
    receive information from the another mobile device indicating that the evacuation route is blocked; and
    determine an alternative evacuation route in response to the information.

13. The mobile device according to claim 12, wherein the egress agent is further configured to periodically transmit the location of the mobile device to a server or to the another device.

14. A memory device comprising program instructions stored thereon that configure a processing device to perform operations comprising:
    receiving an indication of an emergency event at a mobile device executing an egress agent;
    transmitting a location of a mobile device from the mobile device using a peer-to-peer mechanism to another mobile device executing another egress agent in response to the indication of the emergency event;
    activating an emergency response specific to the mobile device according to the location of the mobile device;
    periodically receiving, at the mobile device, a current location of another mobile device and a velocity and a time associated with the another mobile device within the region of interest using a peer-to-peer mechanism from the another mobile device; and
    dynamically changing, using the egress agent executing on the mobile device, the emergency response specific to the mobile device based at least in part on the current location of the another mobile device and the velocity and the time associated with the another mobile device.

15. The memory device of claim 14, wherein the processing device is configured to perform operations further comprising accessing the emergency response from a memory in the mobile device in response to the indication.

16. The memory device of claim 14, wherein the processing device is configured to perform operations further comprising:
    storing a plan of a region of interest into the mobile device;
    determining an evacuation route relative to the plan; and
    including the evacuation route into the emergency response.

17. The memory device of claim 16, wherein the processing device is configured to perform operations further comprising receiving the plan into the mobile device in response to the indication.

18. The memory device of claim 16, wherein the processing device is configured to perform operations further comprising pre-loading the plan into a memory of the mobile device prior at initialization of the mobile device.

19. The memory device of claim 14, wherein the processing device is configured to perform operations further comprising receiving, at the mobile device, the emergency response from a server.

20. The memory device of claim 14, wherein the processing device is configured to perform operations further comprising activating the emergency response according to the location of the mobile device relative to a location of the emergency event.

21. The method according to claim 1, further comprising periodically multicasting a current location of the mobile device to a plurality of mobile devices located within the region of interest.

* * * * *

UNITED STATES PATENT AND TRADEMARK OFFICE
CERTIFICATE OF CORRECTION

PATENT NO. : 8,401,514 B2  
APPLICATION NO. : 12/629942  
DATED : March 19, 2013  
INVENTOR(S) : Ebdon et al.

Page 1 of 1

It is certified that error appears in the above-identified patent and that said Letters Patent is hereby corrected as shown below:

On the title page, item (75), under "Inventors", in Column 1, Line 1, delete "Deren G" and insert -- Deren G. --, therefor.

On the title page, item (75), under "Inventors", in Column 1, Line 2, delete "Robert W" and insert -- Robert W. --, therefor.

In the Claims

In Column 9, Line 31, in Claim 2, delete "comprising-" and insert -- comprising --, therefor.

In Column 9, Line 47, in Claim 6, delete "comprising-" and insert -- comprising --, therefor.

Signed and Sealed this  
First Day of April, 2014

Michelle K. Lee  
*Deputy Director of the United States Patent and Trademark Office*